United States Patent
Wu et al.

(10) Patent No.: US 10,136,160 B2
(45) Date of Patent: Nov. 20, 2018

(54) METHOD AND APPARATUS FOR RESOLUTION ADAPTIVE VIDEO ENCODING WITH SEARCH RANGE CONSTRAINT

(71) Applicant: MEDIATEK INC., Hsin-Chu (TW)

(72) Inventors: Tung-Hsing Wu, Chiayi (TW); Han-Liang Chou, Hsinchu County (TW); Ting-An Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 403 days.

(21) Appl. No.: 14/887,317

(22) Filed: Oct. 19, 2015

(65) Prior Publication Data

US 2016/0119642 A1    Apr. 28, 2016

Related U.S. Application Data

(60) Provisional application No. 62/068,050, filed on Oct. 24, 2014.

(51) Int. Cl.
| | | |
|---|---|---|
| G06T 1/60 | (2006.01) |
| H04N 1/409 | (2006.01) |
| H04N 19/51 | (2014.01) |
| H04N 19/433 | (2014.01) |
| H04N 19/59 | (2014.01) |
| H04N 19/172 | (2014.01) |
| H04N 19/176 | (2014.01) |
| H04N 19/426 | (2014.01) |
| H04N 19/105 | (2014.01) |
| H04N 19/503 | (2014.01) |

(Continued)

(52) U.S. Cl.
CPC ........... *H04N 19/59* (2014.11); *H04N 19/105* (2014.11); *H04N 19/167* (2014.11); *H04N 19/172* (2014.11); *H04N 19/176* (2014.11); *H04N 19/426* (2014.11); *H04N 19/503* (2014.11); *H04N 19/53* (2014.11)

(58) Field of Classification Search
CPC ............................. H04N 11/02; H04N 1/1769
See application file for complete search history.

(56) References Cited

U.S. PATENT DOCUMENTS

| | | | |
|---|---|---|---|
| 2008/0107185 A1* | 5/2008 | Lefol | H04N 19/176 375/240.25 |
| 2009/0207915 A1 | 8/2009 | Yan | |
| 2014/0092969 A1 | 4/2014 | Lee | |

FOREIGN PATENT DOCUMENTS

| | | |
|---|---|---|
| CN | 1610408 A | 4/2005 |
| CN | 1953549 A | 4/2007 |

OTHER PUBLICATIONS

A VP9 Bitstream Overview draft-grange-vp9-bitstream-00, Network Working Group, http://datatracker.ietf.org/doc/draft-grange-vp9-bitstream, Aug. 22, 2013 (Aug. 22, 2013), section 2.2.2, 3.3.

(Continued)

*Primary Examiner* — Sathyanaraya V Perungavoor
*Assistant Examiner* — Patricia I Young
(74) *Attorney, Agent, or Firm* — Winston Hsu

(57) ABSTRACT

An encoding method includes applying a search range constraint on a search range of a block in a current frame, and encoding the block in the current frame with pixel information in a reference frame according to inter prediction performed based on the search range of the block in the current frame, wherein a resolution of the current frame is different from a resolution of the reference frame.

22 Claims, 2 Drawing Sheets

(51) Int. Cl.
H04N 19/167 (2014.01)
H04N 19/53 (2014.01)

(56) References Cited

OTHER PUBLICATIONS

"International Search Report" dated Jan. 27, 2016 for International application No. PCT/CN2015/092514, International filing date: Oct. 22, 2015.

* cited by examiner

METHOD AND APPARATUS FOR RESOLUTION ADAPTIVE VIDEO ENCODING WITH SEARCH RANGE CONSTRAINT

CROSS REFERENCE TO RELATED APPLICATIONS

This application claims the benefit of U.S. provisional application No. 62/068,050, filed on Oct. 24, 2014 and incorporated herein by reference.

BACKGROUND

The present invention relates to video processing, and more particularly, to a method and apparatus for resolution adaptive video encoding with search range constraint.

The conventional video coding standards generally adopt a block based coding technique to exploit spatial and temporal redundancy. For example, the basic approach is to divide the whole source frame into a plurality of blocks, perform intra prediction/inter prediction on each block, transform residues of each block, and perform quantization and entropy encoding. Besides, a reconstructed frame is generated in a coding loop to provide reference pixel data used for encoding following blocks. For certain video coding standards, in-loop filter(s) may be used for enhancing the image quality of the reconstructed frame.

Successive video frames may contain the same objects (still objects or moving objects). Motion estimation can examine the movement of objects in a video sequence composed of successive video frames to try to obtain vectors representing the estimated motion. Next, motion compensation can use the knowledge of object motion obtained by motion estimation to achieve frame data compression. In inter-frame coding, motion estimation and motion compensation have become powerful techniques to eliminate the temporal redundancy due to high correlation between consecutive video frames.

With regard to a typical coding algorithm, a resolution of a current frame is the same as a resolution of a reference frame (e.g., a reconstructed frame). That is, the current frame and the reference frame have the same width and the same height. Hence, a motion vector of a current block in the current frame can be directly used to locate a reference block in the reference block for motion compensation. However, with regard to a newly-developed coding algorithm, it may allow the frame resolution to be changed on-the-fly. For example, VP9 is an open and royalty-free video coding standard promoted by Google®. In accordance with the VP9 coding specification, the resolution can be changed in continuous inter frame encoding. This feature is called resolution reference frame (RRF). Hence, when a current frame is encoded as an inter frame, the resolution of the current frame can be different from the resolution of a reference frame used for inter prediction. Due to discrepancy between resolutions of the current frame and the reference frame, a motion vector of a current block in the current frame cannot be directly used to locate a reference block in the reference frame. Therefore, the block size of the current block in the current frame is scaled to map to a block size in the reference frame, a motion vector found within a search area in the current frame is scaled to map to a motion vector in the reference frame, and a search area size in the current frame is scaled to map to an effective search area size in the reference frame. If the resolution of the current frame is smaller than the resolution of the reference frame, the effective search area in the reference frame will be larger than the search area in the current frame, which requires a larger search buffer to store a group of pixels within the effective search area in the reference frame for motion estimation and motion compensation.

Thus, there is a need for an innovative video encoder design which is capable of supporting resolution adaptive video encoding (e.g., VP9's RRF) with a reduced search buffer size requirement.

SUMMARY

One of the objectives of the claimed invention is to provide a method and apparatus for resolution adaptive video encoding with search range constraint.

According to a first aspect of the present invention, an exemplary encoding method is disclosed. The exemplary encoding method includes: applying a search range constraint on a search range of a block in a current frame; and encoding the block in the current frame with pixel information in a reference frame according to inter prediction performed based on the search range of the block in the current frame, wherein a resolution of the current frame is different from a resolution of the reference frame.

According to a second aspect of the present invention, an exemplary encoding apparatus is disclosed. The exemplary encoding apparatus includes a control circuit and an encoding circuit. The control circuit is arranged to apply a search range constraint on a search range of a block in a current frame. The encoding circuit is arranged to encode the block in the current frame with pixel information in a reference frame according to inter prediction performed based on the search range of the block in the current frame, wherein a resolution of the current frame is different from a resolution of the reference frame.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
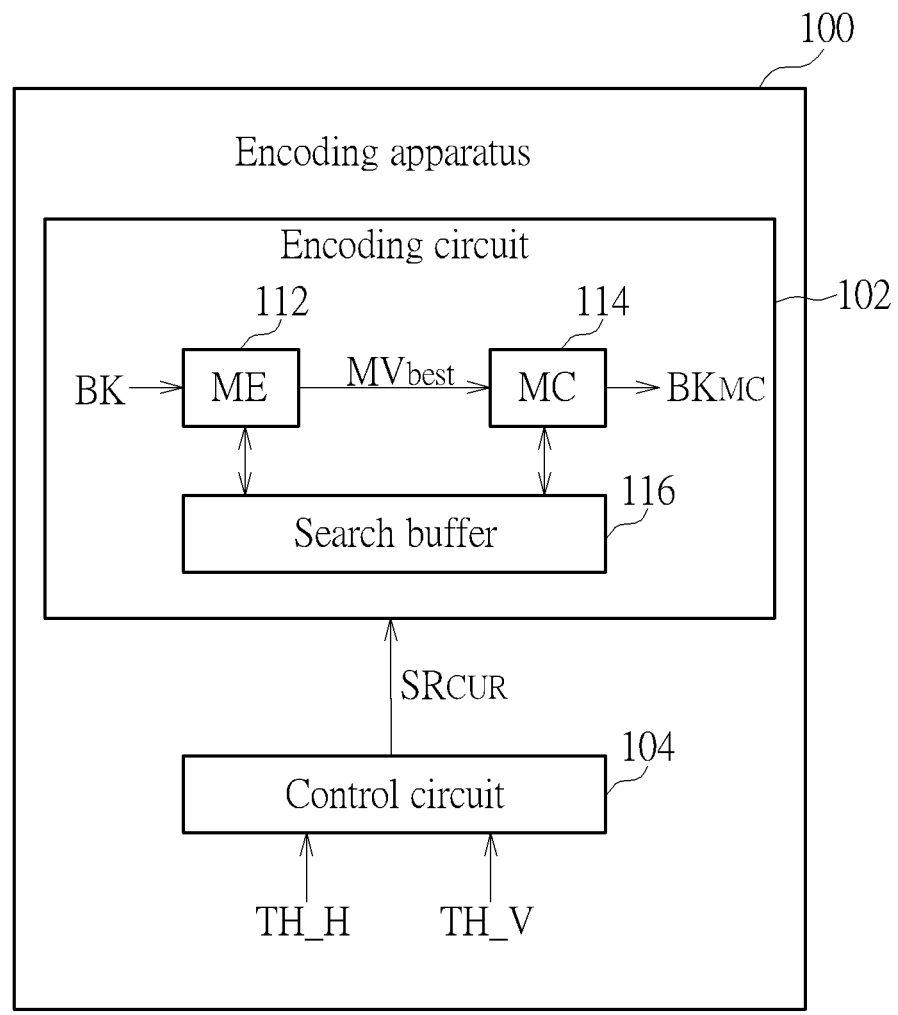
FIG. 1 is a diagram illustrating an encoding apparatus according to an embodiment of the present invention.

FIG. 1 is a diagram illustrating an encoding apparatus according to an embodiment of the present invention. In one application, the encoding apparatus 100 may be a video encoder used to perform a video encoding procedure compliant with an advanced video coding standard such as VP9. However, this is not meant to be a limitation of the present invention. For example, the encoding apparatus 100 may be employed by any resolution adaptive video encoding application. As shown in FIG. 1, the encoding apparatus 100 includes an encoding circuit 102 and a control circuit 104. When encoding a block BK in a current frame, the encoding circuit 102 may decide to use an inter prediction mode to generate predicted samples of the block BK (i.e., a motion-compensated block $BK_{MC}$). Residues derived from subtracting the motion-compensated block $BK_{MC}$ from the block BK are transformed, quantized and entropy encoded. In addition, the inter-prediction mode information, including motion vector related information, associated with encoding of the block BK is added to an encoded bitstream. To support the inter prediction, the encoding circuit 102 is configured to include several circuit components, such as a motion estimation circuit (denoted as "ME") 112, a motion compensation circuit (denoted as "MC") 114 and a search buffer 116. It should be noted that the encoding circuit 102 may further include other circuit components (not shown) to achieve the designated video encoding function.

The search buffer 116 may be an internal memory such as a statistic random access memory (SRAM). When encoding the block BK in the current frame, the encoding circuit 102 loads reference pixels within an effective search area in a reference frame corresponding to a search area defined in the current frame into the search buffer 116. The reference frame is reconstructed during an encoding process of a previous frame. The motion estimation circuit 112 is arranged to find a best motion vector $MV_{best}$ within a search area associated with the block BK. For example, the motion estimation circuit 112 can check candidate motion vectors within the search area defined in the current frame according to reference pixels loaded in the search buffer 116, and selects the best motion vector $MV_{best}$ from the checked candidate motion vectors. For another example, the motion estimation circuit 112 can refer to the search area associated with the block BK to directly use a reference motion vector, which is derived from the motion vectors of neighboring blocks, as the best motion vector $MV_{best}$.

After the best motion vector $MV_{best}$ is determined for the block BK, the motion compensation circuit 114 refers to the best motion vector $MV_{best}$ and the location of the block BK in the current frame to obtain the motion-compensated block $BK_{MC}$ from reference pixels loaded in the search buffer 116. In a case where the resolution of the reference frame is different from the resolution of the current frame, a resizing operation is needed to make a reference block in the reference frame changed to the scale of the current frame to form the motion-compensated block $BK_{MC}$, where the size of the motion-compensated block $BK_{MC}$ is the same as the size of the block BK. For example, the motion compensation circuit 114 may include an interpolation filter to deal with the resizing operation such as fractional-pel interpolation.

In this embodiment, the search buffer 116 has a fixed buffer size, and is shared by continuous inter frame encoding with resolution change and continuous inter frame encoding without resolution change. As mentioned, if the resolution of the current frame is smaller than the resolution of the reference frame, the effective search area in the reference frame would be larger than the search area in the current frame. If the same search range setting used for encoding blocks within the reference frame is used for encoding blocks within the current frame having a lower resolution, the effective search area (which includes a mapped block corresponding to the block BK and a mapped search range corresponding to the search range of the block BK) in the reference frame will be too large to be fully loaded into the search buffer 116 with a fixed buffer size. Hence, the present invention proposes using the control circuit 104 to apply a search range constraint on a search range $SR_{CUR}$ of the block BK in the current frame. In this way, the search range $SR_{CUR}$ is properly limited to thereby ensure that the effective search area in the reference frame meets the storage capacity limitation of the search buffer 116. Further details of controlling the search range $SR_{CUR}$ under the search range constraint are described as below.

Figure 2:
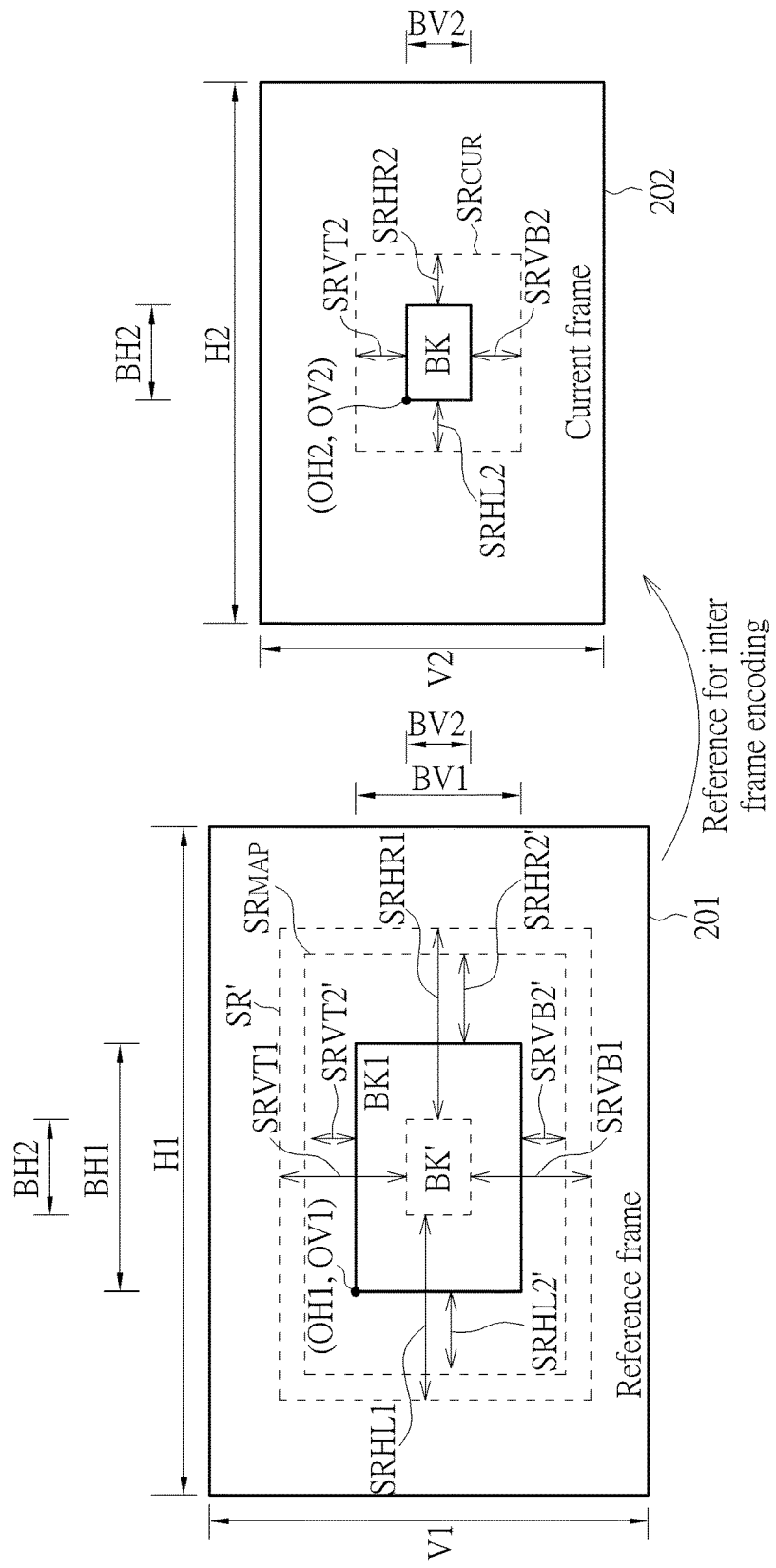
FIG. 2 is a diagram illustrating continuous inter frame encoding with resolution change according to an embodiment of the present invention.

FIG. 2 is a diagram illustrating continuous inter frame encoding with resolution change according to an embodiment of the present invention. The encoding apparatus 100 is used to encode the block BK in the current frame 202 under inter prediction mode. Hence, the block BK in the current frame 202 is encoded with pixel information of a reference frame 201 (which is reconstructed in an encoding process of a previous frame) according to inter prediction performed based on the search range $SR_{CUR}$ of the block BK in the current frame 202. As shown in FIG. 2, the resolution of the current frame 202 is different from the resolution of the reference frame 201. For example, an RRF feature specified in VP9 coding standard may be employed to encode the current frame 202 being an inter frame. In one exemplary design, a first dimension of a frame/block may mean a horizontal direction, and a second dimension of the frame/block may mean a vertical direction. In another exemplary design, a first dimension of a frame/block may mean a vertical direction, and a second dimension of the frame/block may mean a horizontal direction. For clarity and simplicity, the following assumes that the first dimension is the horizontal direction, and the second dimension is the vertical direction. The resolution of the current frame 202 in the first dimension has a first-dimension frame size (e.g., width size) H2, and the resolution of the current frame 202 in the second dimension has a second-dimension frame size (e.g., height size) V2. In addition, the resolution of the reference frame 201 in the first dimension has a first-dimension frame size (e.g., width size) H1, and the resolution of the reference frame 201 in the second dimension has a second-dimension frame size (e.g., height size) V1. Since the resolution of the current frame 202 is different from the resolution of the reference frame 201, it means H1≠H2 and/or V1≠V2. In this example shown in FIG. 2, H2<H1 and V2<V1. However, this is for illustrative purposes only, and is not meant to be a limitation of the present invention.

As shown in FIG. 2, a first-dimension block size (e.g., width size) in the first dimension of the block BK is BH2, and a second-dimension block size (e.g., height size) in the second dimension of the block BK is BV2. The coordinate of the block BK in the current frame 202 is (OH2, OV2), where OH2 is a left-most pixel position of the block BK, and OV2 is a top-most pixel position of the block BK. In accordance with the RRF feature specified in VP9 coding standard, the block size of the block BK in the current frame 202 is scaled to map to a block size of a mapped block BK1 in the reference frame 201. In this example, the coordinate of the mapped block BK1 in the reference frame 201 is (OH1, OV1), where OH1 is a left-most pixel position of the mapped block BK1, and OV1 is a top-most pixel position of the mapped block BK1. Further, in accordance with scaling and mapping due to resolution discrepancy between the current frame 202 and the reference frame 201, a first-dimension block size (e.g., width size) in the first dimension of the mapped block BK1 is BH1, and a second-dimension block size (e.g., height size) in the second dimension of the mapped block BK1 is BV1. The scaling and mapping between the block BK in the current frame 202 and the mapped block BK1 in the reference frame 201 can be expressed using following formulas.

$$OH1=OH2*RH12 \qquad (1)$$

$$OV1=OV2*RV12 \qquad (2)$$

$$BH1=BH2*RH12 \qquad (3)$$

$$BV1=BV2*RV12 \qquad (4)$$

In above formulas (1)-(4), RH12 represents a ratio of the resolution of the reference frame 201 in the first dimension to the resolution of the current frame 202 in the first dimension (i.e., RH12=H1/H2), and RV12 represents a ratio of the resolution of the reference frame 201 in the second dimension to the resolution of the current frame 202 in the second dimension (i.e., RV12=V1/V2).

As shown in FIG. 2, a first-dimensional search range size in the first dimension of the search range $SR_{CUR}$ surrounding the block BK in the current frame 202 is set by a left search range size SRHL2 and a right search range size SRHR2, and a second-dimensional search range size in the second dimension of the search range $SR_{CUR}$ surrounding the block BK in the current frame 202 is set by a top search range size SRVT2 and a bottom search range size SRVB2. Hence, a search area associated with motion estimation of the block BK in the current frame 202 includes the search range $SR_{CUR}$ and the block BK, and therefore has a search area size (BH2+SRHL2+SRHR2)*(BV2+SRVT2+SRVB2).

In accordance with the RRF feature specified in VP9 coding standard, the search area size in the current frame 202 is scaled to map to an effective search area size (i.e., a mapped search area size) in the reference frame 201. As shown in FIG. 2, a first-dimensional mapped search range size in the first dimension of a mapped search range $SR_{MAP}$ surrounding the mapped block BK1 in the reference frame 201 is set by a left mapped search range size SRHL2' and a right mapped search range size SRHR2'1, and a second-dimensional mapped search range size in the second dimension of the mapped search range $SR_{MAP}$ surrounding the mapped block BK1 in the reference frame 201 is set by a top mapped search range size SRVT2' and a bottom mapped search range size SRVB2'. The scaling and mapping between the search area size in the current frame 202 and the effective search area size (i.e., mapped search area size) in the reference frame 201 can be expressed using following formulas.

$$SRHL2'=CSRHL2*RH12 \qquad (5)$$

$$SRHR2'=CSRHR2*RH12 \qquad (6)$$

$$SRVT2'=CSRVT2*RV12 \qquad (7)$$

$$SRVB2'=CSRVB2*RV12 \qquad (8)$$

Hence, regarding continuous inter frame encoding with resolution change between the current frame 202 and the reference frame 201, a mapped search area in the reference frame 201 that is associated with motion estimation of the block BK in the current frame 202 includes the mapped search range $SR_{MAP}$ and the mapped block BK1, and therefore has a mapped search area size (BH1+SRHL2'+RHR2')*(BV1+SRVT2'+SRVB2'). It should be noted that the scaling relation depicted in FIG. 2 is for illustrative purposes only, and is not meant to be a limitation of the present invention.

The reference frame 201 is reconstructed in an encoding process of a previous frame preceding the current frame 202. Since the reference frame 201 is a reconstructed frame of the previous frame, the resolution of the reference frame 201 is the same as the resolution of the previous frame. Suppose that the previous frame is encoded under no resolution change in continuous inter frame encoding. For a block BK' (e.g., M×N prediction block or N×N prediction block) in the previous frame, it has the same block size as the block BK (e.g., M×N prediction block or N×N prediction block) in the current frame 202. As shown in FIG. 2, a first-dimensional search range size in the first dimension of a search range SR' surrounding the block BK' is set by a left search range size SRHL1 and a right search range size SRHR1, and a second-dimensional search range size in the second dimension of the search range SR' surrounding the block BK' is set by a top search range size SRVT1 and a bottom search range size SRVB1. Hence, a search area associated with motion estimation of the block BK' includes the search range SR' and the block BK', and therefore has a search area size (BH2+SRHL1+SRHR1)*(BV2+SRVT1+SRVB1).

It should be noted that the search buffer 116 shown in FIG. 1 has a fixed buffer size and is shared by continuous inter frame encoding with resolution change and continuous inter frame encoding without resolution change. For example, the fixed buffer size may be exactly equal to or slightly larger than the search area size (BH2+SRHL1+SRHR1)*(BV2+SRVT1+SRVB1) of the block BK' encoded by continuous inter frame encoding with no resolution change. Hence, the search area size (BH2+SRHL2+SRHR2)*(BV2+SRVT2+SRVB2) of the block BK in the current frame 202 should be properly controlled to prevent the mapped search area size (BH1+SRHL2'+SRHR2')*(BV1+SRVT2'+SRVB2') from exceeding the fixed buffer size of the search buffer 116). Otherwise, the mapped search area in the reference frame 201 that is associated with motion estimation of the block BK in the current frame 202 cannot be fully loaded into the search buffer 116 with a fixed buffer size. For example, the mapped search area size (BH1+SRHL2'+SRHR2')*(BV1+SRVT2'+SRVB2') can be controlled to be equal to or smaller than the search area size (BH2+SRHL1+SRHR1)*(BV2+SRVT1+SRVB1) that may be exactly equal to or slightly larger than the fixed buffer size of the search buffer 116.

In this embodiment, the control circuit 104 is used to apply a search range constraint on the search range $SR_{CUR}$ of the block BK in the current frame, where the search range $SR_{CUR}$ is configured by the left search range size SRHL2, the right search range size SRHR2, the top search range size SRVT2, and the bottom search range size SRVB2. For clarity and simplicity, the following assumes that SRHL1=SRHR1=SRH1, SRVT1=SRVB1=SRV1, SRHL2=SRHR2=SRH2, SRVT2=SRVB2=SRV2. However, this is for illustrative purposes only, and is not meant to be a limitation of the present invention.

When the search range constraint is enabled, a first-dimension search range size (e.g., 2*SRH2) will be adjusted to be a first-dimension constrained search range size, and a second-dimension search range size (e.g., 2*SRV2) will be adjusted to be a second-dimension constrained search range size. Hence, a search range size of the search range $SR_{CUR}$ of the block BK is set by the first-dimension constrained search range size and the second-dimension constrained search range size for meeting the storage capacity limitation of the search buffer 116.

In this embodiment, the control circuit 104 is arranged to determine a first-dimension size threshold TH_H in the first dimension (e.g., horizontal direction), and set a first-dimension constrained search range size (e.g., 2*SRH2) in the first dimension of the search range $SR_{CUR}$ that satisfies a first criterion defined by at least the first-dimension size threshold TH_H, and is further arranged to determine a second-dimension size threshold TH_V in the second dimension (e.g., vertical direction), and set a second-dimension constrained search range size (e.g., 2*SRV2) in the second dimension of the search range $SR_{CUR}$ that satisfies a second criterion defined by at least the second-dimension size threshold TH_V. For clarity and simplicity, it is assumed that the first dimension is the horizontal direction and the second dimension is the vertical direction. However, a person skilled in the art should readily appreciate that the same invention concept can be applied to a condition that the first dimension is the vertical direction and the second dimension is the horizontal direction.

The search range constraint is applied to a search range of a block in a current frame under resolution change in continuous inter frame encoding. Hence, a search range size of the search range used for inter prediction of the block in the current frame under resolution change in continuous inter frame encoding will be different from a search range size of a search range used for inter prediction of a same-sized block in a previous frame under no resolution change in continuous inter frame encoding. Several exemplary embodiments of determining the search range $SR_{CUR}$ under the search range constraint are described as below.

In a first exemplary embodiment of determining the search range $SR_{CUR}$, the control circuit 104 determines the first-dimension size threshold TH_H according to a first-dimension block size BH2 in the first dimension of the block BK and a first-dimension search range size 2*SRH1 in the first dimension of the search range SR' under no resolution change in continuous inter frame encoding, and further determines the second-dimension size threshold TH_V according to a second-dimension block size BV2 in the second dimension of the block BK and the second-dimension search range size 2*SRV1 in the second dimension of the search range SR' under no resolution change in continuous inter frame encoding. For example, the first-dimension size threshold TH_H and the second-dimension size threshold TH_V can be set by using following formulas.

$$TH\_H = BH2 + 2*SRH1 \quad (9)$$

$$TH\_V = BV2 + 2*SRV1 \quad (10)$$

In addition, the control circuit 104 sets the first-dimension constrained search range size 2*SRH2 that prevents a first-dimension mapped search area size from exceeding the first-dimension size threshold TH_H, wherein the first-dimension mapped search area size is determined according to the first-dimension block size BH2, the first-dimension constrained search range size 2*SRH2, and the ratio RH12. For example, the first criterion for applying the search range constraint on the first-dimension search range size in the first dimension may be expressed using the following formula.

$$(BH2+2*SRH1) \geq (BH2+2*SRH2)*RH12 \quad (11)$$

Similarly, the control circuit 104 sets the second-dimension constrained search range size 2*SRV2 that prevents a second-dimension mapped search area size from exceeding the second-dimension size threshold TH_V, wherein the second-dimension mapped search area size is determined according to the second-dimension block size BV2, the second-dimension constrained search range size 2*SRV2, and the ratio RV12. For example, the second criterion for applying the search range constraint on the second-dimension search range size in the second dimension may be expressed using the following formula.

$$(BV2+2*SRV1) \geq (BV2+2*SRV2)*RV12 \quad (12)$$

Hence, the first-dimension constrained search range size 2*SRH2 is limited to a value that can satisfy the first criterion as defined in formula (11), and the second-dimension constrained search range size 2*SRV2 is limited to a value that can satisfy the second criterion as defined in formula (12). In a case where the resolution of the current frame is smaller than the resolution of the reference frame, one or both of the ratios RH12 and RV12 may be larger than 1, and the search range $SR_{CUR}$ of the block BK may be reduced to satisfy the hardware constraint imposed on the internal memory (e.g., search buffer 116 with a fixed buffer size). In another case where the resolution of the current frame is larger than the resolution of the reference frame, one or both of the ratios RH12 and RV12 may be smaller than 1, and the search range $SR_{CUR}$ of the block BK may be extended without violating the hardware constraint imposed on the internal memory (e.g., search buffer 116 with a fixed buffer size).

In a second exemplary embodiment of determining the search range $SR_{CUR}$, the control circuit 104 determines the first-dimension size threshold TH_H according to a first-dimension search range size 2*SRH1 in the first dimension of a search range SR' under no resolution change in continuous inter frame encoding, and further determines the second-dimension size threshold TH_V according to a second-dimension search range size 2*SRV1 in the second dimension of the search range SR' under no resolution change in continuous inter frame encoding. For example, the first-dimension size threshold TH_H and the second-dimension size threshold TH_V can be set by using following formulas.

$$TH\_H = 2*SRH1 \quad (13)$$

$$TH\_V = 2*SRV1 \quad (14)$$

In addition, the control circuit 104 sets the first-dimension constrained search range size 2*SRH2 that prevents a first-dimension mapped search range size from exceeding the first-dimension size threshold TH_H, wherein the first-dimension mapped search range size is determined according to the first-dimension constrained search range size 2*SRH2 and the ratio RH12. For example, the first criterion for applying the search range constraint on the first-dimension search range size in the first dimension may be expressed using the following formula.

$$2*SRH1 \geq (2*SRH2)*RH12 \quad (15)$$

Similarly, the control circuit 104 sets the second-dimension constrained search range size 2*SRV2 that prevents a second-dimension mapped search range size from exceeding the second-dimension size threshold TH_V, wherein the second-dimension mapped search range size is determined according to the second-dimension constrained search range size 2*SRV2 and the ratio RV12. For example, the second criterion for applying the search range constraint on the second-dimension search range size in the second dimension may be expressed using the following formula.

$$2*SRV1 \geq (2*SRV2)*RV12 \quad (16)$$

Hence, the first-dimension constrained search range size 2*SRH2 is limited to a value that can satisfy the first criterion as defined in formula (15), and the second-dimension constrained search range size 2*SRV2 is limited to a value that can satisfy the second criterion as defined in formula (16). In a case where the resolution of the current frame is smaller than the resolution of the reference frame, one or both of the ratios RH12 and RV12 may be larger than 1, and the search range $SR_{CUR}$ of the block BK may be reduced to satisfy the hardware constraint imposed on the internal memory (e.g., search buffer 116 with a fixed buffer size). In another case where the resolution of the current frame is larger than the resolution of the reference frame, one or both of the ratios RH12 and RV12 may be smaller than 1, and the search range $SR_{CUR}$ of the block BK may be extended without violating the hardware constraint imposed on the internal memory (e.g., search buffer 116 with a fixed buffer size).

In other exemplary embodiments, additional factors may be considered to refine the first criteria as defined in formulas (11) and (15) and the second criteria as defined in formulas (12) and (16). For example, a first-dimension padding size PadH in the first dimension may be introduced into each of the first criteria as defined in formulas (11) and (15), and a second-dimension padding size PadV in the second dimension may be introduced into each of the second criteria as defined in formulas (12) and (16). For example, the first-dimension padding size PadH and the second-dimension padding size PadV may be predetermined values that are set before encoding of the block BK in the current frame 201 is started. In other words, the first-dimension padding size PadH and the second-dimension padding size PadV can be adjusted at the block level. For another example, the first-dimension padding size PadH and the second-dimension padding size PadV may be predetermined values that are set before encoding of the current frame 201 is started. In other words, the first-dimension padding size PadH and the second-dimension padding size PadV can be adjusted at the frame level. It should be noted that the first-dimension padding size PadH and the second-dimension padding size PadV can be positive values or negative values, depending upon actual design consideration.

In one exemplary implementation, the first-dimension padding size PadH and the second-dimension padding size PadV may be set by considering a clipping function. For example, search ranges/areas with different sizes within a predetermined range may be clipped to have the same size, thereby facilitating the hardware implementation. For another example, a search range/area with a non-integer size in any of the first dimension and the second dimension may be clipped to have an integer size, thereby facilitating the hardware implementation.

In another exemplary implementation, the first-dimension padding size PadH and the second-dimension padding size PadV may be set by considering inherent characteristics of an interpolation filter used to calculate interpolated pixels for setting the motion-compensated block $BK_{MC}$. The interpolation filter may include a vertical filter and a horizontal filter. For example, each of the vertical filter and the horizontal filter is an 8-tap filter. Concerning the horizontal filter, X-axis pixel values of 8 pixels located at the same Y-axis position are fed into the 8-tap filter, and an X-axis pixel value of one interpolated pixel is generated from the 8-tap filter. Concerning the vertical filter, Y-axis pixel values of 8 pixels located at the same X-axis position are fed into the 8-tap filter, and a Y-axis pixel value of one interpolated pixel is generated from the 8-tap filter. Hence, it is possible that some pixels outside a mapped search area in the reference frame are needed by the interpolation filter to calculate pixel values of interpolated pixels at/near boundaries of the motion-compensated block $BK_{MC}$, and should be loaded into the search buffer 116 that is also accessed by the motion compensation circuit 114 shown in FIG. 1.

In yet another exemplary implementation, the first-dimension padding size PadH and the second-dimension padding size PadV may be set by considering the clipping function and inherent characteristics of the interpolation filter.

The first-dimension padding size PadH and the second-dimension padding size PadV can be considered for applying the search range constraint on the search range $SR_{CUR}$ of the block BK in the current frame. In a third exemplary embodiment of determining the search range $SR_{CUR}$, the control circuit 104 determines the first-dimension size threshold TH_H according to the first-dimension block size BH2 in the first dimension of the block BK in the current frame 202, the first-dimension padding size PadH in the first dimension, and the first-dimension search range size 2*SRH1 in the first dimension of the search range SR' under no resolution change in continuous inter frame encoding, and further determines the second-dimension size threshold TH_V according to the second-dimension block size BV2 in the second dimension of the block BK in the current frame 202, the second-dimension padding size PadV in the second dimension, and the second-dimension search range size 2*SRV1 in the second dimension of the search range SR' under no resolution change in continuous inter frame encoding. For example, the first-dimension size threshold TH_H and the second-dimension size threshold TH_V can be set by using following formulas.

$$TH\_H = BH2 + 2*SRH1 + PadH \quad (17)$$

$$TH\_V = BV2 + 2*SRV1 + PadV \quad (18)$$

In addition, the control circuit 104 sets the first-dimension constrained search range size 2*SRH2 that prevents a first-dimension mapped search area size from exceeding the first-dimension size threshold TH_H, wherein the first-dimension mapped search area size is determined according to the first-dimension block size BH2, the first-dimension constrained search range size 2*SRH2, and the ratio RH12. For example, the first criterion for applying the search range constraint on the first-dimension search range size in the first dimension may be expressed using the following formula.

$$(BH2 + 2*SRH1 + PadH) \geq (BH2 + 2*SRH2)*RH12 \quad (19)$$

Similarly, the control circuit 104 sets the second-dimension constrained search range size 2*SRV2 that prevents a second-dimension mapped search area size from exceeding the second-dimension size threshold TH_V, wherein the second-dimension mapped search area size is determined according to the second-dimension block size BV2, the second-dimension constrained search range size 2*SRV2, and the ratio RV12. For example, the second criterion for applying the search range constraint on the second-dimension search range size in the second dimension may be expressed using the following formula.

$$(BV2 + 2*SRV1 + PadV) \geq (BV2 + 2*SRV2)*RV12 \quad (20)$$

Hence, the first-dimension constrained search range size 2*SRH2 is limited to a value that can satisfy the first criterion as defined in formula (19), and the second-dimension constrained search range size 2*SRV2 is limited to a value that can satisfy the second criterion as defined in formula (20). In a case where the resolution of the current frame is smaller than the resolution of the reference frame, one or both of the ratios RH12 and RV12 may be larger than 1, and the search range $SR_{CUR}$ of the block BK may be reduced to satisfy the hardware constraint imposed on the internal memory (e.g., search buffer 116 with a fixed buffer size). In another case where the resolution of the current frame is larger than the resolution of the reference frame, one or both of the ratios RH12 and RV12 may be smaller than 1, and the search range $SR_{CUR}$ of the block BK may be extended without violating the hardware constraint imposed on the internal memory (e.g., search buffer 116 with a fixed buffer size).

In a fourth exemplary embodiment of determining the search range $SR_{CUR}$, the control circuit 104 determines the first-dimension size threshold TH_H according to the first-dimension padding size PadH in the first dimension and the first-dimension search range size 2*SRH1 in the first dimension of the search range SR' under no resolution change in continuous inter frame encoding, and further determines the second-dimension size threshold TH_V according to the second-dimension padding size PadV in the second dimension and the second-dimension search range size 2*SRV1 in the second dimension of the search range SR' under no resolution change in continuous inter frame encoding. For example, the first-dimension size threshold TH_H and the second-dimension size threshold TH_V can be set by using following formulas.

$$TH\_H = 2*SRH1 + PadH \quad (21)$$

$$TH\_V = 2*SRV1 + PadV \quad (22)$$

In addition, the control circuit 104 sets the first-dimension constrained search range size 2*SRH2 that prevents a first-dimension mapped search range size from exceeding the first-dimension size threshold TH_H, wherein the first-dimension mapped search range size is determined according to the first-dimension constrained search range size 2*SRH2 and the ratio RH12. For example, the first criterion for applying the search range constraint on the first-dimension search range size in the first dimension may be expressed using the following formula.

$$2*SRH1 + PadH \geq (2*SRH2)*RH12 \quad (23)$$

Similarly, the control circuit 104 sets the second-dimension constrained search range size 2*SRV2 that prevents a second-dimension mapped search range size from exceeding the second-dimension size threshold TH_V, wherein the second-dimension mapped search range size is determined according to the second-dimension constrained search range size 2*SRV2 and the ratio RV12. For example, the second criterion for applying the search range constraint on the second-dimension search range size in the second dimension may be expressed using the following formula.

$$2*SRV1 + PadV \geq (2*SRV2)*RV12 \quad (24)$$

Hence, the first-dimension constrained search range size 2*SRH2 is limited to a value that can satisfy the first criterion as defined in formula (23), and the second-dimension constrained search range size 2*SRV2 is limited to a value that can satisfy the second criterion as defined in formula (24). In a case where the resolution of the current frame is smaller than the resolution of the reference frame, one or both of the ratios RH12 and RV12 may be larger than 1, and the search range $SR_{CUR}$ of the block BK may be reduced to satisfy the hardware constraint imposed on the internal memory (e.g., search buffer 116 with a fixed buffer size). In another case where the resolution of the current frame is larger than the resolution of the reference frame, one or both of the ratios RH12 and RV12 may be smaller than 1, and the search range $SR_{CUR}$ of the block BK may be extended without violating the hardware constraint imposed on the internal memory (e.g., search buffer 116 with a fixed buffer size).

In the aforementioned third exemplary embodiment and fourth exemplary embodiment, the first-dimension padding size PadH and the second-dimension padding size PadV are considered for determining the first-dimension size threshold TH_H and the second-dimension size threshold TH_V. Alternatively, the first-dimension padding size PadH and the second-dimension padding size PadV may be considered for evaluating a first-dimension mapped search area/range size and a second-dimension mapped search area/range size.

In a fifth exemplary embodiment of determining the search range $SR_{CUR}$, the control circuit 104 determines the first-dimension size threshold TH_H according to the first-dimension block size BH2 in the first dimension of the block BK in the current frame 202 and the first-dimension search range size 2*SRH1 in the first dimension of the search range SR' under no resolution change in continuous inter frame encoding, and further determines the second-dimension size threshold TH_V according to the second-dimension block size BV2 in the second dimension of the block BK in the current frame 202 and the second-dimension search range size 2*SRV1 in the second dimension of the search range SR' under no resolution change in continuous inter frame encoding. For example, the first-dimension size threshold TH_H can be set by using above formula (9), and the second-dimension size threshold TH_V can be set by using above formula (10).

In addition, the control circuit 104 sets the first-dimension constrained search range size 2*SRH2 that prevents a first-dimension mapped search area size from exceeding the first-dimension size threshold TH_H, wherein the first-dimension mapped search area size is determined according to the first-dimension block size BH2, the first-dimension constrained search range size 2*SRH2, the first-dimension padding size PadH, and the ratio RH12. For example, the first criterion for applying the search range constraint on the first-dimension search range size in the first dimension may be expressed using the following formula.

$$(BH2 + 2*SRH1) \geq (BH2 + 2*SRH2 + PadH)*RH12 \quad (25)$$

Similarly, the control circuit 104 sets the second-dimension constrained search range size 2*SRV2 that prevents a second-dimension mapped search area size from exceeding the second-dimension size threshold TH_V, wherein the second-dimension mapped search area size is determined according to the second-dimension block size BV2, the second-dimension constrained search range size 2*SRV2, the second-dimension padding size PadV, and the ratio RV12. For example, the second criterion for applying the search range constraint on the second-dimension search range size in the second dimension may be expressed using the following formula.

$$(BV2 + 2*SRV1) \geq (BV2 + 2*SRV2 + PadV)*RV12 \quad (26)$$

Hence, the first-dimension constrained search range size 2*SRH2 is limited to a value that can satisfy the first criterion as defined in formula (25), and the second-dimension constrained search range size 2*SRV2 is limited to a value that can satisfy the second criterion as defined in formula (26). In a case where the resolution of the current frame is smaller than the resolution of the reference frame, one or both of the ratios RH12 and RV12 may be larger than 1, and the search range $SR_{CUR}$ of the block BK may be reduced to satisfy the hardware constraint imposed on the internal memory (e.g., search buffer 116 with a fixed buffer size). In another case where the resolution of the current frame is larger than the resolution of the reference frame, one or both of the ratios RH12 and RV12 may be smaller than 1, and the search range $SR_{CUR}$ of the block BK may be extended without violating the hardware constraint imposed on the internal memory (e.g., search buffer 116 with a fixed buffer size).

In a sixth exemplary embodiment of determining the search range $SR_{CUR}$, the control circuit 104 determines the first-dimension size threshold TH_H according to the first-dimension search range size 2*SRH1 in the first dimension of the search range SR' under no resolution change in continuous inter frame encoding, and further determines the second-dimension size threshold TH_V according to the second-dimension search range size 2*SRV1 in the first dimension of the search range SR' under no resolution change in continuous inter frame encoding. For example, the first-dimension size threshold TH_H can be set by using the above formula (13), and the second-dimension size threshold TH_V can be set by using the above formula (14).

In addition, the control circuit 104 sets the first-dimension constrained search range size 2*SRH2 that prevents a first-dimension mapped search range size from exceeding the first-dimension size threshold TH_H, wherein the first-dimension mapped search range size is determined according to the first-dimension constrained search range size 2*SRH2, the first-dimension padding size PadH, and the ratio RH12. For example, the first criterion for applying the search range constraint on the first-dimension search range size in the first dimension may be expressed using the following formula.

$$2*SRH1 \geq (2*SRH2 + PadH)*RH12 \quad (27)$$

Similarly, the control circuit 104 sets the second-dimension constrained search range size 2*SRV2 that prevents a second-dimension mapped search range size from exceeding the second-dimension size threshold TH_V, wherein the second-dimension mapped search range size is determined according to the second-dimension constrained search range size 2*SRV2, the second-dimension padding size PadV, and the ratio RV12. For example, the second criterion for applying the search range constraint on the second-dimension search range size in the second dimension may be expressed using the following formula.

$$2*SRV1 \geq (2*SRV2 + PadV)*RV12 \quad (28)$$

Hence, the first-dimension constrained search range size 2*SRH2 is limited to a value that can satisfy the first criterion as defined in formula (27), and the second-dimension constrained search range size 2*SRV2 is limited to a value that can satisfy the second criterion as defined in formula (28). In a case where the resolution of the current frame is smaller than the resolution of the reference frame, one or both of the ratios RH12 and RV12 may be larger than 1, and the search range $SR_{CUR}$ of the block BK may be reduced to satisfy the hardware constraint imposed on the internal memory (e.g., search buffer 116 with a fixed buffer size). In another case where the resolution of the current frame is larger than the resolution of the reference frame, one or both of the ratios RH12 and RV12 may be smaller than 1, and the search range $SR_{CUR}$ of the block BK may be extended without violating the hardware constraint imposed on the internal memory (e.g., search buffer 116 with a fixed buffer size).

In above exemplary embodiments, a first criterion for applying search range constraint on a first-dimension search range size in a first dimension (e.g., horizontal direction) and a second criterion for applying search range constraint on a second-dimension search range size in a second dimension (e.g., vertical direction) are considered, separately. That is, a first-dimension constrained search range size (e.g., 2*SRH2) in the first dimension of the search range $SR_{CUR}$ and a second-dimension constrained search range size (e.g., 2*SRV2) in the second dimension of the search range $SR_{CUR}$ are constrained based on the first criterion and the second criterion, respectively. Alternatively, the first-dimension constrained search range size (e.g., 2*SRH2) in the first dimension of the search range $SR_{CUR}$ and the second-dimension constrained search range size (e.g., 2*SRV2) in the second dimension of the search range $SR_{CUR}$ may be jointly set based on a single criterion. As mentioned above, the search area size of the block BK in the current frame 202 should be properly controlled to prevent the mapped search area size in the reference frame 201 from exceeding the fixed buffer size of the search buffer 116. Hence, the single criterion can be set according to a buffer size threshold TH_BUF. For example, the buffer size threshold TH_BUF may be equal to or smaller than the fixed buffer size of the search buffer 116.

In a seventh exemplary embodiment of determining the search range $SR_{CUR}$, the control circuit 104 determines the buffer size threshold TH_BUF, and jointly sets the first-dimension constrained search range size (e.g., 2*SRH2) in the first dimension of the search range $SR_{CUR}$ and the second-dimension constrained search range size (e.g., 2*SRV2) in the second dimension of the search range $SR_{CUR}$ that can satisfy a single criterion defined by at least the buffer size threshold TH_BUF. For example, the buffer size threshold TH_BUF may be conceptually decomposed into the first-dimension size threshold TH_H in the first dimension (e.g., horizontal direction) and the second-dimension size threshold TH_V in the second dimension (e.g., vertical direction), and may be expressed using the following formula.

$$TH\_BUF = TH\_H * TH\_V \quad (29)$$

Actually, the setting of the buffer size threshold TH_BUF is constrained by the fixed buffer size of the search buffer 116. For example, when the first-dimension size threshold TH_H is set by a larger value, the second-dimension size threshold TH_V can be set by a smaller value; and when the first-dimension size threshold TH_H is set by a smaller value, the second-dimension size threshold TH_V can be set by a larger value.

Considering a case similar to that in the aforementioned first exemplary embodiment of determining the search range $SR_{CUR}$, the single criterion used by this exemplary embodiment for applying search range constraint on one or both of the first-dimension search range size in the first dimension and the second-dimension search range size in the second dimension may be expressed using the following formula.

$$TH\_BUF \geq [(BH2 + 2*SRH2)*RH12]*[(BV2 + 2*SRV2)*RV12] \quad (30)$$

Hence, the first-dimension constrained search range size (e.g., 2*SRH2) and the second-dimension constrained search range size (e.g., 2*SRV2) are jointly limited to values that can satisfy the single criterion as defined in formula (30). Supposing that the buffer size threshold TH_BUF may be conceptually decomposed into the first-dimension size threshold TH_H and the second-dimension size threshold TH_V, the single criterion may be satisfied by the first-dimension search range size (e.g., 2*SRH2) and the second-dimension search range size (e.g., 2*SRV2) under a condition that TH_H≥(BH2+2*SRH2)*RH12 & TH_V≥(BV2+2*SRV2)*RV12, or a condition that TH_H≥(BH2+2*SRH2)*RH12 & TH_V<(BV2+2*SRV2)*RV12, or a condition that TH_H<(BH2+2*SRH2)*RH12 & TH_V≥(BV2+2*SRV2)*RV12. In some other embodiments, one or both of the first-dimension search range size in the first dimension and the second-dimension search range size in the second dimension may be determined using the formula (30) without considering TH_H and TH_V, which should not be limited in this disclosure.

Considering a case similar to that in the aforementioned second exemplary embodiment of determining the search range $SR_{CUR}$, the single criterion used by this exemplary embodiment for applying search range constraint on one or both of the first-dimension search range size in the first dimension and the second-dimension search range size in the second dimension may be expressed using the following formula.

$$TH\_BUF \geq [(2*SRH2)*RH12]*[(2*SRV2)*RV12] \quad (31)$$

Hence, the first-dimension constrained search range size (e.g., 2*SRH2) and the second-dimension constrained search range size (e.g., 2*SRV2) are jointly limited to values that can satisfy the single criterion as defined in formula (31). Supposing that the buffer size threshold TH_BUF may be conceptually decomposed into the first-dimension size threshold TH_H and the second-dimension size threshold TH_V, the single criterion may be satisfied by the first-dimension search range size (e.g., 2*SRH2) and the second-dimension search range size (e.g., 2*SRV2) under a condition that TH_H≥(2*SRH2)*RH12 & TH_V≥(2*SRV2)*RV12, or a condition that TH_H≥(2*SRH2)*RH12 & TH_V<(2*SRV2)*RV12, or a condition that TH_H<(2*SRH2)*RH12 & TH_V≥(2*SRV2)*RV12. In some other embodiments, one or both of the first-dimension search range size in the first dimension and the second-dimension search range size in the second dimension may be determined using the formula (31) without considering TH_H and TH_V, which should not be limited in this disclosure.

Considering a case similar to that in the aforementioned third exemplary embodiment of determining the search range $SR_{CUR}$, the single criterion used by this exemplary embodiment for applying search range constraint on one or both of the first-dimension search range size in the first dimension and the second-dimension search range size in the second dimension may be expressed using the following formula.

$$TH\_BUF \geq [(BH2+2*SRH2)*RH12]*[(BV2+2*SRV2)*RV12] \quad (32)$$

Hence, the first-dimension constrained search range size (e.g., 2*SRH2) and the second-dimension constrained search range size (e.g., 2*SRV2) are jointly limited to values that can satisfy the single criterion as defined in formula (32). Supposing that the buffer size threshold TH_BUF may be conceptually decomposed into the first-dimension size threshold TH_H and the second-dimension size threshold TH_V, the single criterion may be satisfied by the first-dimension search range size (e.g., 2*SRH2) and the second-dimension search range size (e.g., 2*SRV2) under a condition that TH_H≥(BH2+2*SRH2)*RH12 & TH_V≥(BV2+2*SRV2)*RV12, or a condition that TH_H≥(BH2+2*SRH2)*RH12 & TH_V<(BV2+2*SRV2)*RV12, or a condition that TH_H<(BH2+2*SRH2)*RH12 & TH_V≥(BV2+2*SRV2)*RV12. In some other embodiments, one or both of the first-dimension search range size in the first dimension and the second-dimension search range size in the second dimension may be determined using the formula (32) without considering to TH_H and TH_V, which should not be limited in this disclosure.

Considering a case similar to that in the aforementioned fourth exemplary embodiment of determining the search range $SR_{CUR}$, the single criterion used by this exemplary embodiment for applying search range constraint on one or both of the first-dimension search range size in the first dimension and the second-dimension search range size in the second dimension may be expressed using the following formula.

$$TH\_BUF \geq [(2*SRH2)*RH12]*[(2*SRV2)*RV12] \quad (33)$$

Hence, the first-dimension constrained search range size (e.g., 2*SRH2) and the second-dimension constrained search range size (e.g., 2*SRV2) are jointly limited to values that can satisfy the single criterion as defined in formula (33). Supposing that the buffer size threshold TH_BUF may be conceptually decomposed into the first-dimension size threshold TH_H and the second-dimension size threshold TH_V, the single criterion may be satisfied by the first-dimension search range size (e.g., 2*SRH2) and the second-dimension search range size (e.g., 2*SRV2) under a condition that TH_H≥(2*SRH2)*RH12 & TH_V≥(2*SRV2)*RV12, or a condition that TH_H≥(2*SRH2)*RH12 & TH_V<(2*SRV2)*RV12, or a condition that TH_H<(2*SRH2)*RH12 & TH_V≥(2*SRV2)*RV12. In some other embodiments, one or both of the first-dimension search range size in the first dimension and the second-dimension search range size in the second dimension may be determined using the formula (33) without considering TH_H and TH_V, which should not be limited in this disclosure.

Considering a case similar to that in the aforementioned fifth exemplary embodiment of determining the search range $SR_{CUR}$, the single criterion used by this exemplary embodiment for applying search range constraint on one or both of the first-dimension search range size in the first dimension and the second-dimension search range size in the second dimension may be expressed using the following formula.

$$TH\_BUF \geq [(BH2+2*SRH2+PadH)*RH12]*[(BV2+2*SRV2+PadV)*RV12] \quad (34)$$

Hence, the first-dimension constrained search range size (e.g., 2*SRH2) and the second-dimension constrained search range size (e.g., 2*SRV2) are jointly limited to values that can satisfy the single criterion as defined in formula (34). Supposing that the buffer size threshold TH_BUF may be conceptually decomposed into the first-dimension size threshold TH_H and the second-dimension size threshold TH_V, the single criterion may be satisfied by the first-dimension search range size (e.g., 2*SRH2) and the second-dimension search range size (e.g., 2*SRV2) under a condition that TH_H≥(BH2+2*SRH2+PadH)*RH12 & TH_V≥(BV2+2*SRV2+PadV)*RV12, or a condition that TH_H≥(BH2+2*SRH2+PadH)*RH12 & TH_V<(BV2+2*SRV2+PadV)*RV12, or a condition that TH_H<(BH2+2*SRH2+PadH)*RH12 & TH_V≥(BV2+2*SRV2+PadV)*RV12. In some other embodiments, one or both of the first-dimension search range size in the first dimension and the second-dimension search range size in the second dimension may be determined using the formula (34) without considering TH_H and TH_V, which should not be limited in this disclosure.

Considering a case similar to that in the aforementioned sixth exemplary embodiment of determining the search range $SR_{CUR}$, the single criterion used by this exemplary embodiment for applying search range constraint on one or both of the first-dimension search range size in the first dimension and the second-dimension search range size in the second dimension may be expressed using the following formula.

$$TH\_BUF \geq [(2*SRH2+PadH)*RH12]*[(2*SRV2+PadV)*RV12] \quad (35)$$

Hence, the first-dimension constrained search range size (e.g., 2*SRH2) and the second-dimension constrained search range size (e.g., 2*SRV2) are jointly limited to values that can satisfy the single criterion as defined in formula (35). Supposing that the buffer size threshold TH_BUF may be conceptually decomposed into the first-dimension size threshold TH_H and the second-dimension size threshold TH_V, the single criterion may be satisfied by the first-dimension search range size (e.g., 2*SRH2) and the second-dimension search range size (e.g., 2*SRV2) under a condition that TH_H≥(2*SRH2+PadH)*RH12 & TH_V≥(2*SRV2+PadV)*RV12, or a condition that TH_H≥(2*SRH2+PadH)*RH12 & TH_V<(2*SRV2+PadV)*RV12, or a condition that TH_H<(2*SRH2+PadH)*RH12 & TH_V≥(2*SRV2+PadV)*RV12. In some other embodiments, one or both of the first-dimension search range size in the first dimension and the second-dimension search range size in the second dimension may be determined using the formula (35) without considering TH_H and TH_V, which should not be limited in this disclosure.

In summary, concerning the seventh exemplary embodiment of determining the search range $SR_{CUR}$, the first-dimension constrained search range size 2*SRH2 and the second-dimension constrained search range size 2*SRV2 are allowed to be set by any values as long as the values can satisfy the single criterion as defined in one of the formulas (30)-(35). In a case where the resolution of the current frame is smaller than the resolution of the reference frame, one or both of the ratios RH12 and RV12 may be larger than 1, and the search range $SR_{CUR}$ of the block BK may be reduced to satisfy the hardware constraint imposed on the internal memory (e.g., search buffer 116 with a fixed buffer size). In another case where the resolution of the current frame is larger than the resolution of the reference frame, one or both of the ratios RH12 and RV12 may be smaller than 1, and the search range $SR_{CUR}$ of the block BK may be extended without violating the hardware constraint imposed on the internal memory (e.g., search buffer 116 with a fixed buffer size).

It should be noted that the reference frame 201 is reconstructed from an encoding process of a previous frame, and each of the current frame 202 and the previous frame is encoded as a single spatial layer. In other words, the current frame 202 and the reference frame 201 having different resolutions are not different spatial layers (e.g., base spatial layer and extended spatial layer) of the same image content. Further, the best motion vector $MV_{best}$ found by the motion estimation circuit 112 should be limited to the search range $SR_{CUR}$ constrained by the control circuit 104 according a set of one first criterion defined by one first-dimension size threshold and one second criterion defined by one second-dimension size threshold. For example, the best motion vector $MV_{best}$ of the block BK in the current frame may be selected from a plurality of candidate motion vectors searched within the search range $SR_{CUR}$ set by the control circuit 104. For another example, the best motion vector $MV_{best}$ of the block BK in the current frame may be set by a motion vector of a neighboring block (e.g., a co-located block in a previous frame), where the motion vector of the neighboring block is within the search range $SR_{CUR}$ set by the control circuit 104.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An encoding method comprising:
    obtaining a reference frame that is reconstructed in an encoding process of a previous frame preceding a current frame, wherein the reference frame is a reconstructed frame of the previous frame;
    applying a search range constraint on a search range of a block in the current frame;
    loading reference pixels within an effective search area in the reference frame into a search buffer for use by inter prediction of the block in the current frame, wherein the effective search area in the reference frame corresponds to a search area in the current frame, and the search area in the current frame comprises the search range of the block in the current frame; and
    encoding the block in the current frame with pixel information in the reference frame according to the inter prediction performed based on the search range of the block in the current frame;
    wherein a resolution of the current frame is different from a resolution of the reference frame, and is also different from a resolution of the previous frame.

2. The encoding method of claim 1, wherein applying the search range constraint comprises:
    determining a first-dimension size threshold in a first dimension; and
    setting a first-dimension constrained search range size in the first dimension of the search range that satisfies a first criterion defined by at least the first-dimension size threshold.

3. The encoding method of claim 2, wherein applying the search range constraint further comprises:
    determining a second-dimension size threshold in a second dimension different from the first dimension; and
    setting a second-dimension constrained search range size in the second dimension of the search range that satisfies a second criterion defined by at least the second-dimension size threshold.

4. The encoding method of claim 2, wherein determining the first-dimension size threshold in the first dimension comprises:
    determining the first-dimension size threshold according to at least a first-dimension search range size in the first dimension of a search range under no resolution change in continuous inter frame encoding.

5. The encoding method of claim 4, wherein determining the first-dimension size threshold according to at least the first-dimension search range size comprises:
    determining the first-dimension size threshold according to at least a first-dimension block size in the first dimension of the block in the current frame and the first-dimension search range size.

6. The encoding method of claim 5, wherein setting the first-dimension constrained search range size comprises:
    setting the first-dimension constrained search range size that prevents a first-dimension mapped search area size from exceeding the first-dimension size threshold, wherein the first-dimension mapped search area size is determined according to the first-dimension block size, the first-dimension constrained search range size, and a ratio of the resolution of the reference frame in the first dimension to the resolution of the current frame in the first dimension.

7. The encoding method of claim 5, wherein setting the first-dimension constrained search range size comprises:
   setting the first-dimension constrained search range size that prevents a first-dimension mapped search area size from exceeding the first-dimension size threshold, wherein the first-dimension mapped search area size is determined according to the first-dimension block size, the first-dimension constrained search range size, a first-dimension padding size in the first dimension, and a ratio of the resolution of the reference frame in the first dimension to the resolution of the current frame in the first dimension.

8. The encoding method of claim 7, wherein the first-dimension padding size is a predetermined value that is set before encoding of the block in the current frame or encoding of the current frame is started.

9. The encoding method of claim 5, wherein determining the first-dimension size threshold according to at least the first-dimension block size and the first-dimension search range size comprises:
   determining the first-dimension size threshold according to the first-dimension block size, the first-dimension search range size, and a first-dimension padding size in the first dimension.

10. The encoding method of claim 9, wherein the first-dimension padding size is a predetermined value that is set before encoding of the block in the current frame or encoding of the current frame is started.

11. The encoding method of claim 9, wherein setting the first-dimension constrained search range size comprises:
    setting the first-dimension constrained search range size that prevents a first-dimension mapped search area size from exceeding the first-dimension size threshold, wherein the first-dimension mapped search area size is determined according to the first-dimension block size, the first-dimension constrained search range size, and a ratio of the resolution of the reference frame in the first dimension to the resolution of the current frame in the first dimension.

12. The encoding method of claim 4, wherein setting the first-dimension constrained search range size comprises:
    setting the first-dimension constrained search range size that prevents a first-dimension mapped search range size from exceeding the first-dimension size threshold, wherein the first-dimension mapped search range size is determined according to the first-dimension constrained search range size and a ratio of the resolution of the reference frame in the first dimension to the resolution of the current frame in the first dimension.

13. The encoding method of claim 11, wherein setting the first-dimension constrained search range size comprises:
    setting the first-dimension constrained search range size that prevents a first-dimension mapped search range size from the first-dimension size threshold, wherein the first-dimension mapped search range size is determined according to the first-dimension constrained search range size, a first-dimension padding size in the first dimension, and a ratio of the resolution of the reference frame in the first dimension to the resolution of the current frame in the first dimension.

14. The encoding method of claim 13, wherein the first-dimension padding size is a predetermined value that is set before encoding of the block in the current frame or encoding of the current frame is started.

15. The encoding method of claim 4, wherein determining the first-dimension size threshold according to at least the first-dimension search range size comprises:
    determining the first-dimension size threshold according to the first-dimension search range size and a first-dimension padding size in the first dimension.

16. The encoding method of claim 15, wherein the first-dimension padding size is a predetermined value that is set before encoding of the block in the current frame or encoding of the current frame is started.

17. The encoding method of claim 15, wherein setting the first-dimension constrained search range size comprises:
    setting the first-dimension constrained search range size that prevents a first-dimension mapped search range size from exceeding the first-dimension size threshold, wherein the first-dimension mapped search range size is determined according to the first-dimension constrained search range size and a ratio of the resolution of the reference frame in the first dimension to the resolution of the current frame in the first dimension.

18. The encoding method of claim 1, wherein each of the current frame and the previous frame is encoded as a single spatial layer.

19. The encoding method of claim 1, wherein a motion vector of the block is limited by the search range controlled by the search range constraint.

20. The encoding method of claim 1, wherein applying the search range constraint comprises:
    determining a buffer size threshold; and
    jointly setting a first-dimension constrained search range size in a first dimension of the search range and a second-dimension constrained search range size in a second dimension of the search range that satisfy a single criterion defined by at least the buffer size threshold.

21. The encoding method of claim 1, wherein the block in the current frame is encoded using resolution reference frame encoding.

22. An encoding apparatus comprising:
    a control circuit, arranged to apply a search range constraint on a search range of a block in a current frame; and
    an encoding circuit, arranged to obtain a reference frame that is reconstructed in an encoding process of a previous frame preceding the current frame, load reference pixels within an effective search area in the reference frame into a search buffer for use by inter prediction of the block in the current frame, and encode the block in the current frame with pixel information in the reference frame according to the inter prediction performed based on the search range of the block in the current frame, wherein the reference frame is a reconstructed frame of the previous frame, the effective search area in the reference frame corresponds to a search area in the current frame, and the search area in the current frame comprises the search range of the block in the current frame;
    wherein a resolution of the current frame is different from a resolution of the reference frame, and is also different from a resolution of the previous frame.

* * * * *